July 5, 1949.	L. C. HAYNES	2,475,498
IMPLEMENT ATTACHMENT FOR TRACTORS
Filed Aug. 16, 1946	2 Sheets-Sheet 1
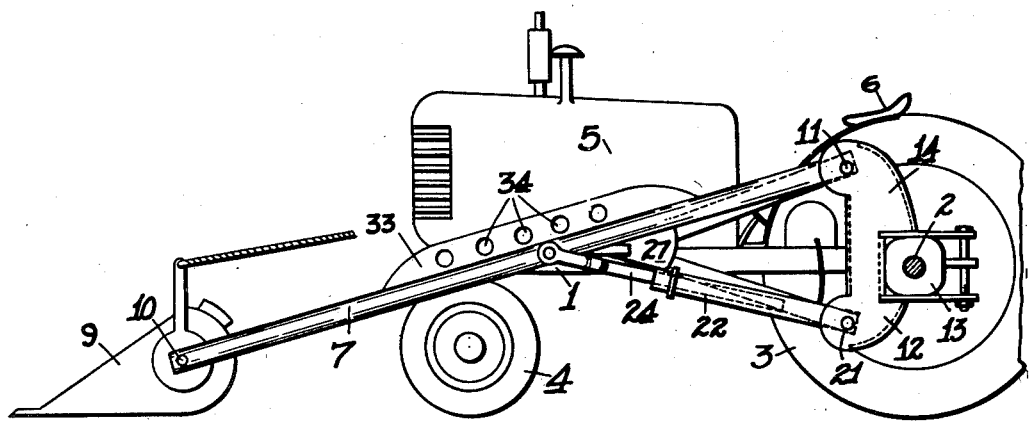
Fig.1.
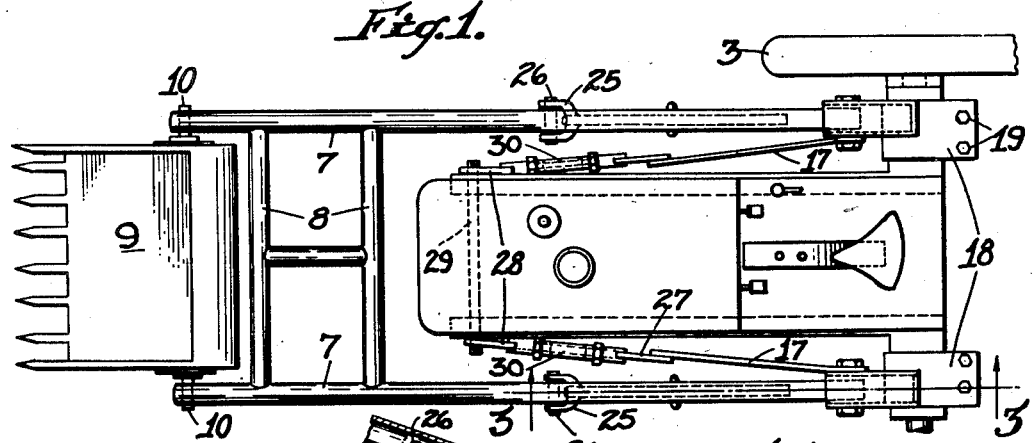
Fig.2.
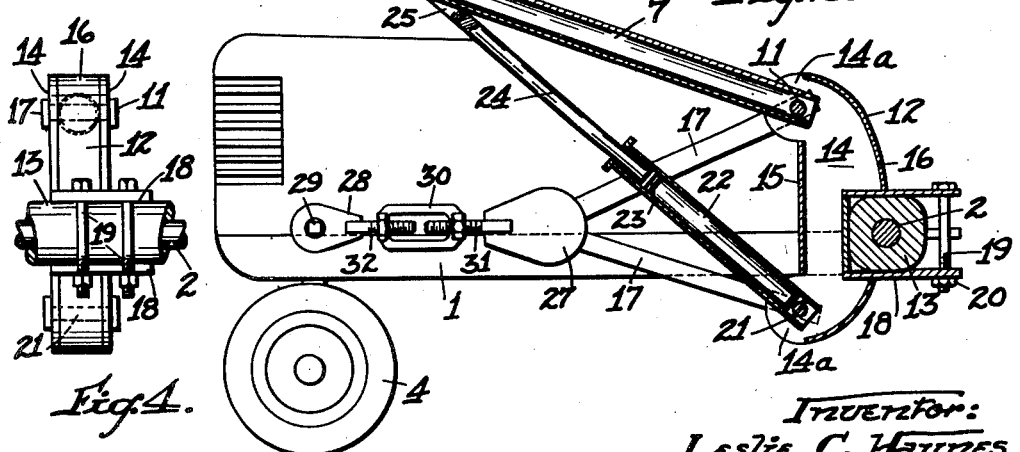
Fig.4.
Fig.3.
Inventor:
Leslie C. Haynes
By Owen W. Kennedy
Attorney July 5, 1949.  L. C. HAYNES  2,475,498
IMPLEMENT ATTACHMENT FOR TRACTORS
Filed Aug. 16, 1946  2 Sheets-Sheet 2

Inventor:
Leslie C. Haynes
By Owen W. Kennedy
Attorney

Patented July 5, 1949

2,475,498

UNITED STATES PATENT OFFICE 2,475,498

IMPLEMENT ATTACHMENT FOR TRACTORS

Leslie C. Haynes, Worcester, Mass.

Application August 16, 1946, Serial No. 690,939

3 Claims. (Cl. 214—140)

1

The present invention relates to an improved implement attachment for wheeled tractors of the type commonly employed on farms and construction jobs, and has for its object to provide an arrangement that can be readily applied to existing tractor constructions for the support and operation of various types of implements, such as loading and scraping devices which operate in front of the tractor.

According to the present invention, there is provided an improved tractor attachment in the form of a strongly braced structure providing arms extending on either side of the tractor for carrying the implement. The arms of the structure are pivotedly mounted on yokes of special construction supported by the rear axle of the tractor with each axle yoke being braced by torque members attached to the tractor frame, so that the yokes will resist displacement when the arms are subjected to heavy stresses in the operation of the associated implement. The above and other advantageous features of the invention will hereinafter more fully appear from the following description considered in connection with the accompanying drawings, in which Fig. 1 is a view in side elevation of a tractor provided with an implement attachment embodying the present invention, with one rear wheel of the tractor removed.

Fig. 2 is a plan view of the parts shown in Fig. 1.

Fig. 3 is a fragmentary view, partially in section, along the line 3—3 of Fig. 2, and showing the implement carrying arms in raised position.

Fig. 4 is a rear view of one of the axle yokes for mounting the attachment.

Figure 5:
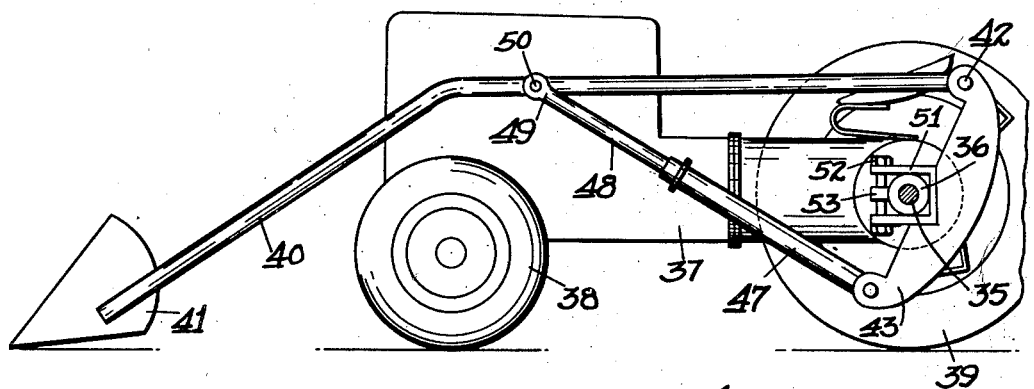
Fig. 5 shows a modified form of attachment.

Referring first to Fig. 1, a conventional type of tractor is shown generally, in outline, as comprising the usual frame 1 mounted on a rear axle 2 and driving wheels 3, and with the forward part of the frame 1 supported by steering wheels 4 underneath the frame. The hood enclosing the engine is indicated at 5 with the driver's seat 6 located above the rear axle 2 in the usual manner, where it is accessible to the various controls for operating the tractor and the implement carried by my improved attachment.

The implement attachment of the present invention comprises arms 7 extending in parallel relation along each side of the tractor frame 1 and secured together in front of the tractor by cross bars 8. As best shown in Fig. 3, the arms 7 and cross bars 8 are of tubular form welded together to form a rigid and substantially unitary structure embracing the forward part of the tractor. The outer ends of the arms 7 serve to support between them an implement 9, here shown in the form of a scoop or shovel supported for turning movement between the arms 7 by pivots 10.

The arms 7 of the attachment are supported at their inner ends on heavy pins 11 each forming part of a yoke 12 attached to the housing 13 of the rear axle 2. As best shown in Fig. 3, each yoke 12 is of box form comprising side plates 14 and cross plates 15 and 16, all welded together to form a heavy unitary structure. All the plates, 14, 15 and 16 are flame-cut from sheet metal of heavy gage, and it is to be noted in Fig. 3 that the side plates 14 present curved rear surfaces that are in the form of an arc drawn about a center of curvature located substantially at the junction between torque members 17 forming part of a bracing arrangement for each yoke 12 that will be later described.

Each yoke 12 further provides rearwardly extending lugs 18 separated by a distance substantially equal to the diameter of the rear axle housing 13, with the lugs 18 embracing the housing 13 and extending beyond the same. Each yoke 12 is rigidly secured to the axle housing 13 by means of bolts 19 extending between the lugs 18, with nuts 20 cooperating with the bolts 19 to hold each yoke 12 on the axle housing 13, with the front cross plates 15 in a substantially vertical position.

The side plates 14 of each yoke 12 extend above and below the cross plate 15 to provide projections 14a for the support of the pivot pin 11 of each arm 7, and for a second pivot pin 21 for mounting an operating cylinder 22. The pins 11 and 21 are in vertical alignment and the connected arm 7 and cylinder 22 can each swing freely in the spaces between the projections 14a of the side plates 14 across which the pins 11 and 21 extend, see Fig. 3.

Each cylinder 22 has a piston 23 operating therein in response to fluid pressure medium admitted to the cylinder and a piston rod 24 extends forwardly toward the implement arm 7. The piston rod 24 is provided with an integrally formed fork 25, the sides of which embrace the arm 7 and are pivotedly connected thereto by a pin 26, as best shown in the sectioned portion of Fig. 3. The admission of a fluid pressure medium to each cylinder 22 is controlled in any suitable manner, not shown, and movement of the pistons 23 towards the outer ends of their cylinders 22 will cause the piston rods 24 to move the implement arms 7 from the normally lowered position of Fig. 1 to the raised position of Fig. 3. When this occurs, the arms 7 and the piston rods 24 are subjected to heavy strains which are transmitted to the ends of each yoke 12, and the present invention further provides an improved arrangement of the torque members 17 which will strongly brace the yokes 12 against any displacement on the axle housing 13.

As best shown in Fig. 3, the torque members 17 extend from the top and bottom projections 14a of each yoke 12, adjacent the pivot pins 11 and 21, and converge at their opposite ends on an anchor plate 27. The torque members 17 are welded at their ends to the projections 14a of the inner side plates 14 of each yoke 12 and to the anchor plate 27, so that the connected members form a triangular structure of great strength. Each anchor plate 27 is connected to the tractor frame 1 by means of a link 28 carried at the end of a cross bar 29 extending transversely of the frame 1 as best shown in Fig. 2. The cross bar 29 is rigidly secured to the tractor frame 1 and the opposed ends of each anchor plate 27 and link 28 are connected together by a turnbuckle 30 cooperating with oppositely threaded rods 31 and 32 extending from the anchor plate 27 and link 28, respectively. By means of the turnbuckle 30, the torque members 17 on each side of the frame 1 can be placed in tension so as to strongly hold the associated yoke 12 against displacement and thereby maintain the pivot pins 11 for each arm 7 and cylinder 22 in fixed relation, irrespective of the position of the arms 7 and of the load placed thereon.

In order to stiffen the tubular arms 7 when operating under load, each arm 7 provides a fin 33 extending longitudinally of the arm, as shown in Fig. 1. The fin 33 is of such form that it serves to stiffen the arm 7 over that portion of its length, where the thrust of the piston rod 24 is transmitted to the arm by the fork 25 and its connecting pin 26. The fin 33 provides holes 34 to reduce its weight, but without materially affecting the stiffening of the arm 7, which is due to the great vertical depth of the fin 33, as compared to the diameter of the arm.

From the foregoing, it is apparent that by the present invention there is provided an improved implement attachment for tractors in the form of a strongly braced and integrally welded structure providing arms on either side of the tractor for carrying the implement. The arms are pivotally mounted on yokes of heavy welded plate construction, which yokes also serve to pivotally support cylinders and pistons for operating the arms, with each yoke being strongly held in position on the tractor axle by an arrangement of torque members connected to the tractor frame. The associated implement may therefore be raised or lowered and otherwise operated with the assurance that the supporting attachment will stand up under heavy service conditions, without distortion, such as might impose unbalanced strains on the tractor itself. This is due largely to the fact that the yokes are so rugged and so rigidly held by the torque members, that they constitute, in effect, extensions of the tractor rear axle which is one of the strongest parts of the tractor.

Figure 6:
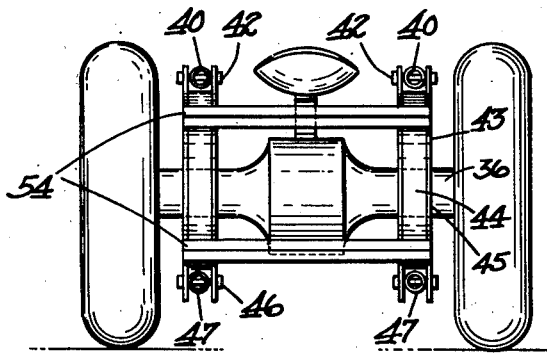
Fig. 6 is a view in rear elevation at the attachment shown in Fig. 5.

Referring now to Figs. 5 and 6 there is shown a modification of the invention wherein the attachment is adapted to fit a type of tractor that does not provide the usual frame such as is shown in connection with the tractor of Fig. 1. In Fig. 5, there is shown a tractor of the Fordson type in which rear axle 35 extends through a housing 36 that is connected as a unit to a casing 37 forming part of the engine assembly. The tractor further provides the usual front and rear wheels 38 and 39 and the modified form of implement attachment is adapted to be supported entirely by the rear axle housing 36.

The implement attachment consists of arms 40 extending along each side of the tractor and secured together by cross members in the same manner as shown in Fig. 1. The outer ends of the arms 40 serve to support between them an implement 41, with the arms inclined upwardly above the front wheels 38. The arms 40 extend rearwardly and are connected at their inner ends by pins 42 mounted on yokes 43 on each side of the axle housing 36. Each yoke 43 is constructed in a manner similar to the yoke 14 previously described except that the yoke 43 is adapted to be applied to the back side of the axle housing 36. Each yoke 43 is of box form composed of plates 44 and 45 welded together, with the plates 44 being spaced apart to receive the end of each arm 40 and its pivot pin 42 as shown in Fig. 6.

The lower end of each yoke 43 carries a second pivot pin 46 for mounting a cylinder 47 having a piston 48 operating therein. The piston 48 extends forwardly toward the implement arm 40 and provides a fork 49 the sides of which embrace the arm 40 and are pivotally connected thereto by a pin 50 in the same manner as shown in Fig. 3. The admission of a fluid pressure medium to each cylinder 47 is controlled in any suitable manner, not shown, and movement of the pistons 48 outwardly will cause raising of the implement arms 40.

When the arms 40 are operated, the forces to which the arms are subjected are transmitted to the ends of the yokes 43 which extend behind the axle 35 and are rigidly connected thereto by means of spaced lugs 51 which embrace the axle housing 36. The ends of the lugs 51 are secured to the axle housing 36 by bolts 52 which pass through a lug 53 forming part of the axle housing 36. Therefore, each yoke 43 is secured to the axle housing 36 and by reason of the fact that the axle housing is located between the yokes 43 and the load carried between arms 40, the yokes are strongly held by the axle which is of rugged construction.

In order to brace the attachment against cross strains, the yokes are rigidly secured together by cross members 54 which extend above and below the axle, the members 54 being in the form of angle-irons with their flanges welded to the outside of each yoke. Therefore, the entire attachment forms a strongly braced structure that is anchored to the rear axle of the tractor and is able to withstand the strains and stresses stepped up by operation of the implement 41.

I claim:

1. An implement attachment for tractors having a frame and a rear axle housing, said attachment comprising, a pair of unitary yoke members being adapted to be substantially vertically disposed and mounted intermediate their ends upon opposite end portions of the rear axle housing, a pair of implement-supporting arms each pivotally mounted at one end thereof upon one end of a respective one of said yokes, a pair of operating cylinders each having one end thereof pivotally mounted upon the other end portion of a respective one of said yokes, a piston operably mounted within each of said cylinders and being pivotally connected to a respective one of said arms at a location substantially midway between the ends of the arm, thereby to form, in conjunction with its associated cylinder, arm and yoke elements, a triangular brace structure, a pair of torque members associated with each of said yokes, each torque member being secured to a respective one of the end portions of its associated yoke, and means for securing together the free end portions of each pair of torque members for attachment to the tractor frame forwardly of the rear axle housing thereby to place said torque members under tension.

2. An implement attachment for tractors having a frame and a rear axle housing, said attachment comprising, a pair of unitary yoke members, each of said yoke members including a pair of parallel plates secured together in laterally spaced relation, a pair of housing-receiving lugs spaced apart longitudinally of said plates and secured to and intermediate the ends of said plates, said yokes being adapted to be mounted upon opposite end portions of the rear axle housing by means of said lugs, a pair of implement-supporting arms each pivotally mounted at one end thereof upon one end of a respective one of said yokes and between the yoke plates, a pair of operating cylinders each having one end thereof pivotally mounted upon the other end portion of a respective one of said yokes and between the yoke plates, a piston operably mounted within each of said cylinders and being pivotally connected to a respective one of said arms at a location substantially midway between the ends of the arm, thereby to form, in conjunction with its associated cylinder, arm and yoke elements, a triangular brace structure, a pair of torque members associated with each of said yokes, each torque member being secured to a respective one of the end portions of its associated yoke, and means for securing together the free end portions of each pair of torque members for attachment to the tractor frame forwardly of the rear axle housing thereby to place said members under tension.

3. The combination with a tractor having a frame and a rear axle housing, of a pair of substantially vertically extending unitary yoke members each being mounted intermediate its ends upon a respective end portion of said rear axle housing, a pair of implement-sustaining arms disposed at opposite sides of said tractor with each arm having one end portion thereof pivotally mounted above said axle housing and upon the top end of a respective one of said yokes, a piston operably disposed within each of said cylinders and having one end thereof pivotally secured to a respective one of said arms substantially midway between the ends thereof, thereby to form, in conjunction with its associated cylinder, arm and yoke elements, a triangular brace structure, a pair of torque members associated with each of said yoke members, each of said torque members having one end thereof secured to a respective one of the ends of its associated yoke and having its other end secured directly to the corresponding end of its associated torque member, and means for securing the joined ends of each of the two pairs of torque members at opposite sides of the tractor frame forwardly of the rear axle housing and intermediate the yoke ends.

LESLIE C. HAYNES.

REFERENCES CITED

The following references are of record in the file of this patent:

UNITED STATES PATENTS

| Number | Name | Date |
| --- | --- | --- |
| 2,001,803 | Stephens | May 21, 1935 |
| 2,319,921 | Dooley et al. | May 25, 1943 |
| 2,341,776 | Heath | Feb. 15, 1944 |
| 2,395,622 | Galbreath | Feb. 26, 1946 |
| 2,398,964 | Rogers et al. | Apr. 23, 1946 |
| 2,417,021 | Simmonds | Mar. 4, 1947 |
| 2,419,493 | Hoff | Apr. 22, 1947 |